(12) United States Patent
Guo et al.

(10) Patent No.: US 11,514,602 B2
(45) Date of Patent: Nov. 29, 2022

(54) METHOD AND APPARATUS FOR GAZE ESTIMATION

(71) Applicant: Samsung Electronics Co., Ltd., Suwon-si (KR)

(72) Inventors: Tianchu Guo, Beijing (CN); Hui Zhang, Beijing (CN); Xiabing Liu, Beijing (CN); Chang Kyu Choi, Seongnam-si (KR); Jaejoon Han, Seoul (KR); Yongchao Liu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 16/722,304

(22) Filed: Dec. 20, 2019

(65) Prior Publication Data

US 2020/0202562 A1 Jun. 25, 2020

(30) Foreign Application Priority Data

Dec. 25, 2018 (CN) .......................... 201811593797.5
Sep. 20, 2019 (KR) .......................... 10-2019-0116321

(51) Int. Cl.
*G06T 7/73* (2017.01)
*G06K 9/62* (2022.01)
*G06V 40/16* (2022.01)

(52) U.S. Cl.
CPC .............. *G06T 7/74* (2017.01); *G06K 9/6215* (2013.01); *G06V 40/168* (2022.01); *G06T 2207/30201* (2013.01)

(58) Field of Classification Search
CPC . G06F 3/013; G06T 7/74; G06T 2207/30201; G06K 9/00268; G06K 9/6215

USPC .......................................................... 382/103
See application file for complete search history.

(56) References Cited

U.S. PATENT DOCUMENTS

| 8,430,510 B2 | 4/2013 | Sugio et al. |
| 9,804,671 B2 | 10/2017 | Taguchi et al. |
| 2005/0182551 A1* | 8/2005 | Sugano .............. B60K 31/0008 701/96 |
| 2009/0086165 A1* | 4/2009 | Beymer ................. A61B 3/113 351/210 |

(Continued)

FOREIGN PATENT DOCUMENTS

| JP | 2014-226377 A | 12/2014 |
| WO | WO 2017/031089 A1 | 2/2017 |

OTHER PUBLICATIONS

Ohno et al, "Just Blink Your Eyes: A Head-Free Gaze Tracking System", CHI 2003 (Year: 2003).*

(Continued)

*Primary Examiner* — Mark Roz
(74) *Attorney, Agent, or Firm* — NSIP Law

(57) ABSTRACT

A gaze estimation method includes receiving, by a processor, input data including a current image and a previous image each including a face of a user, determining, by the processor, a gaze mode indicating a relative movement between the user and a camera that captured the current image and the previous image based on the input data, and estimating, by the processor, a gaze of the user based on the determined gaze mode, wherein the determined gaze mode is one of a plurality of gaze modes comprising a stationary mode and a motion mode.

14 Claims, 6 Drawing Sheets

(56) References Cited

U.S. PATENT DOCUMENTS

2009/0115965 A1* 5/2009 Waldorf ................. G08B 21/06
351/210
2018/0011533 A9    1/2018 Marggraff et al.
2018/0246336 A1    8/2018 Greenberg
2019/0156100 A1*   5/2019 Rougeaux ............... G06F 3/013

OTHER PUBLICATIONS

Kawato et al Detection and Tracking of Eyes for Gaze-camera Control, Proc. of VI2002, 348-353 (Year: 2002).*
(Ohno et al.: FreeGaze: A Gaze Tracking System for Everyday Gaze Interaction, Proc. of ETRA2002, 125-132 (Year: 2002).*

* cited by examiner

METHOD AND APPARATUS FOR GAZE ESTIMATION

This application claims the benefit under 35 USC 119(a) of Chinese Patent Application No. 201811593797.5 filed on Dec. 25, 2018, in the China National Intellectual Property Administration and Korean Patent Application No. 10-2019-0116321 filed on Sep. 20, 2019, in the Korean Intellectual Property Office, the entire disclosures of which are incorporated herein by reference for all purposes.

BACKGROUND

1. Field

The following description relates to gaze estimation that estimates a gaze of a user more accurately by analyzing input data including temporally consecutive images.

2. Description of Related Art

Gaze estimation is drawing a great deal of attention in pursuit of more natural interaction, and accordingly the demand for camera-based gaze estimation is on the rise for interfacing, marketing, and accident prevention for drivers. A direction of a gaze of a user may include information associated with an intention or an interest of the user. Thus, the usage of gaze estimation is expected to expand to a wider range of applications, for example, measuring a promotional effect of digital signage and conducting a survey of a customer purchase trend at a product showcase or display. In addition, gaze estimation may be used to monitor, in real time, a direction of a gaze of a driver or an alertness of the driver using a camera provided in a vehicle, and thus enhance the safety of the driver and prevent traffic accidents. Since cameras are provided or embedded in most personal computers (PCs) and smartphones, gaze estimation may be readily implemented in such products simply by adding software to the products.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a gaze estimation method includes receiving, by a processor, input data including a current image and a previous image each including a face of a user; determining, by the processor, a gaze mode indicating a relative movement between the user and a camera that captured the current image and the previous image based on the input data; and estimating, by the processor, a gaze of the user based on the determined gaze mode, wherein the determined gaze mode is one of a plurality of gaze modes including a stationary mode and a motion mode.

The gaze estimation method may further include adjusting, by the processor, the estimated gaze.

The adjusting may include performing filtering on the estimated gaze based on the determined gaze mode.

The performing of the filtering may include performing the filtering using a filtering method or a parameter that depends on the determined gaze mode.

The performing of the filtering may further include performing the filtering by a linear filter using a parameter of the linear filter in response to the determined gaze mode being the stationary mode; and performing the filtering by the linear filter by initializing the parameter of the linear filter in response to the determined gaze mode being the motion mode.

The adjusting may include performing smoothing on the estimated gaze.

The determining of the gaze mode may include determining the gaze mode to be the stationary mode in response to the current image being an initially captured image and the previous image not existing.

The determining of the gaze mode may include detecting the face included in the input data; and detecting a facial feature point in the detected face.

The determining of the gaze mode may further include determining the gaze mode based on a similarity in terms of the detected facial feature point between the current image and the previous image.

The determining of the gaze mode may further include arranging the current image and the previous image based on a reference facial feature point of each of the current image and the previous image; and determining the gaze mode based on a similarity in terms of a plurality of facial feature points between the current image and the previous image based on a result of the arranging.

The determining of the gaze mode may further include calculating a first similarity in terms of a first facial feature point between the current image and the previous image; calculating a second similarity in terms of a second facial feature point between the current image and the previous image; calculating a third similarity in terms of a background feature point between the current image and the previous image; and determining the gaze mode based on the first similarity, the second similarity, and the third similarity.

The determining of the gaze mode may further include determining the gaze mode to be the stationary mode in response to the first similarity being greater than or equal to a first threshold value and the second similarity being greater than or equal to a second threshold value; determining the gaze mode to be the motion mode in response to the first similarity being less than the first threshold value and the third similarity being greater than or equal to a third threshold value; determining the gaze mode to be the motion mode in response to the first similarity being greater than or equal to the first threshold value and the second similarity being less than the second threshold value; and determining the gaze mode to be a gaze mode of the previous image in response to the first similarity being less than the first threshold value and the third similarity being less than the third threshold value, wherein the first threshold value, the second threshold value, and the third threshold value are equal to each other, or are different from each other.

The gaze estimation method may further include determining whether an eye of the user included in the input data is blinking; and discarding the input data and waiting for next input data to be received in response to a result of the determining being that the eye of the user is blinking.

In another general aspect, a non-transitory computer-readable storage medium stores instructions that, when executed by a processor, cause the processor to perform the gaze estimation method described above.

In another general aspect, a gaze estimation apparatus includes at least one processor; and a memory, wherein the memory is configured to store input data including a current image and a previous image each including a face of a user, and the at least one processor is configured to determine a gaze mode indicating a relative movement between the user and a camera that captured the current image and the previous image based on the input data; and estimate a gaze of the user based on the determined gaze mode, wherein the determined gaze mode is one of a plurality of gaze modes including a stationary mode and a motion mode.

The at least one processor may be further configured to adjust the estimated gaze.

The at least one processor may be further configured to perform filtering on the estimated gaze based on the determined gaze mode.

The at least one processor may be further configured to perform smoothing on the estimated gaze.

The at least one processor may be further configured to detect the face included in the input data; and detect a facial feature point in the detected face.

The at least one processor may be further configured to determine the gaze mode based on a similarity in terms of the detected facial feature point between the current image and the previous image.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
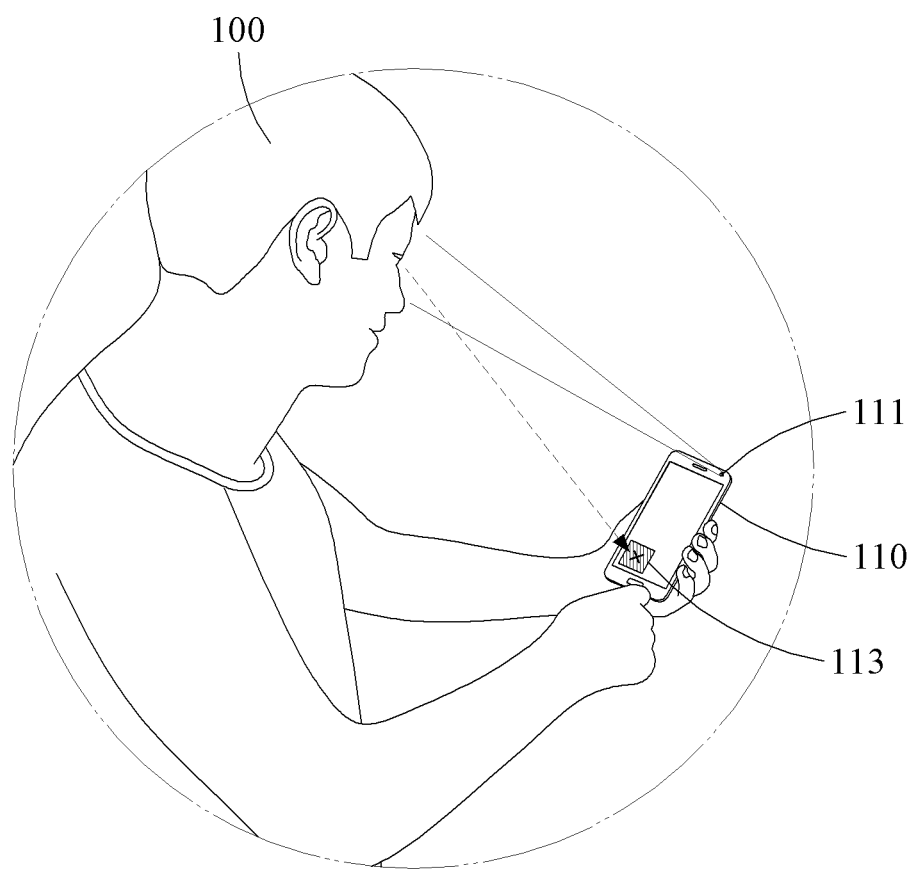
FIG. 1 is a diagram illustrating an example of how a gaze estimation apparatus estimates a gaze of a user.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. The articles "a," "an," and "the" are intended to include the plural forms as well, unless the context clearly indicates otherwise. The term "and/or" includes any one and any combination of any two or more of the associated listed items. The terms "include," "comprise," and "have" specify the presence of stated features, numbers, operations, elements, components, and/or combinations thereof, but do not preclude the presence or addition of one or more other features, numbers, operations, elements, components, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, similar expressions, for example, "between" and "immediately between," and "adjacent to" and "immediately adjacent to," are also to be construed in the same way.

Unless otherwise defined, all terms, including technical and scientific terms, used herein have the same meaning as commonly understood in the art to which the disclosure of this application pertains based on an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

FIG. 1 is a diagram illustrating an example of how a gaze estimation apparatus estimates a gaze of a user.

Referring to FIG. 1, a gaze estimation apparatus 110 estimates a gaze of a user 100 by analyzing input data including a face of the user 100. The gaze estimation apparatus 110 more accurately estimates the gaze of the user 100 by analyzing input data including temporally consecutive images. The gaze estimation apparatus 110 detects a relative movement between the user 100 and a camera 111 that captured the temporally consecutive images, and uses an analysis method suitable for the detected relative movement, thereby increasing a stability of gaze estimation.

The gaze estimation apparatus 110 exhibits great performance associated with stability and speed. For example, even when the gaze of the user 100 is fixated at one point or finely moves towards another point near the point, the gaze estimation apparatus 110 stably estimates the gaze of the user 100 even if the gaze estimation apparatus 110 is shaken greatly. When a gaze of the user 100 moves from one point to another point, the gaze estimation apparatus 110 estimates a new location of the gaze in real time.

The gaze estimation apparatus 110 has various applications. For example, the user 100 may operate an application program through his/her gaze. The user 100 may move a cursor of the application program by using her/his gaze as a mouse, and click the mouse by blinking her/his eye. In another example, an advertisement 113 may be displayed at a location of the gaze of the user 100 estimated by the gaze estimation apparatus 110, which may improve an effectiveness of the advertisement 113.

In one example, the gaze estimation apparatus 110 receives input data including a current image and a previous image that include a face of the user 100. The input data may include still images, or a moving image or a video. The input data may include still images captured by a camera, or a frame sequence of a video. The input data may include at least two still images, or at least two frames of a video. Hereinafter, both a still image and a frame included in a video will be referred to simply as an image.

The input data includes a plurality of images that are temporally close to one another. For example, the input data may include an image captured at a first time, and an image captured at a second time. In this example, the second time is a time subsequent to the first time. For example, the input data may include an image captured at 0 seconds and an image previously captured at a certain time before 0 seconds, for example, at −0.2 seconds. Herein, a current image is an image captured at a current time, and a previous image is an image captured before the current time. The input data is used to determine a gaze mode.

The gaze estimation apparatus 110 determines a gaze mode indicating a relative movement between the user 110 and the camera 111 based on the input data. The gaze mode indicates a relative movement between a user whose images have been captured and a camera that captured the images. The determined gaze mode is one of a plurality of gaze modes including a stationary mode and a motion mode. The stationary mode is a gaze mode in which a gaze moves only finely or does not move, and the motion mode is a gaze mode in which a gaze moves greatly. The determining of the gaze mode includes detecting a feature point in the input data and determining a similarity between a current image and a previous image based on the feature point. Herein, gaze estimation is described in relation to a human being, and determining a similarity between a current image and a previous image that are included in input data includes determining the similarity between the current image and the previous image based on a facial feature of the human being, for example, a feature of a nose and a feature of an eye. Herein, a feature of a face, a feature of a nose, a feature of an eye, and a feature of a background may be simply and interchangeably referred to as a facial feature, a nose feature, an eye feature, and a background feature, respectively. In addition, a feature point may also be referred to as a key point or a landmark.

The gaze estimation apparatus 110 estimates a gaze of the user 100 based on the determined gaze mode. The estimated gaze may be represented in various ways. For example, the estimated gaze may be represented by a coordinate (x, y) of a point on a screen at which the user 100 gazes, but is not limited thereto.

The gaze estimation apparatus 110 may adjust the estimated gaze. The gaze estimation apparatus 110 may perform filtering or smoothing as postprocessing. For example, the gaze estimation apparatus 110 may perform the filtering on the estimated gaze using a linear filter.

In this example, by adjusting a parameter of the linear filter based on the gaze mode, it is possible to adjust the gaze more accurately. For example, when the gaze mode is the stationary mode, the gaze estimation apparatus 110 may perform the filtering using an existing parameter of the linear filter. When the gaze mode is the motion mode, the gaze estimation apparatus 110 may perform the filtering after initializing the parameter of the linear filter.

Additionally, the gaze estimation apparatus 110 may detect an eye blink and remove the detected eye blink from the input data. Using input data including an eye blink may result in an error in gaze estimation when the gaze estimation apparatus 110 is optimized for input data including an open eye. A gaze estimation based on the input data including an eye blink may be basically ineffective or invalid, and thus may cause noise in an output in a subsequent process. Thus, the gaze estimation apparatus 110 may remove the input data including an eye blink, and thus enhance an overall performance of the gaze estimation.

The gaze estimation apparatus 110 may use a neural network. For example, the gaze estimation apparatus 110 may include a long short-term memory (LSTM), or a time sequence-based network, such as, for example, a recurrent neural network (RNN). The gaze estimation apparatus 110 may estimate a gaze of a user by collecting, in real time, input data based on a time sequence, and input an image sequence based on the time sequence. The neural network included in the gaze estimation apparatus 110 may be trained in advance based on training data. The gaze estimation apparatus 110 may train the neural network based on various situations. For example, the neural network may be trained with two cases, for example, one in which a user gazes at a same point, and another one in which the user suddenly gazes at another point. For optimization in such various situations, the gaze estimation apparatus 110 may include a plurality of neural networks each trained for a different situation. The gaze estimation apparatus 110 may classify a situation, select a neural network trained for the classified situation, and analyze input data using the selected neural network.

The gaze estimation apparatus 110 may include a terminal configured to transmit and receive various sets of data using an intermediary communication device including an access point (AP), in response to an operation by a user. The terminal may be, for example, a personal computer (PC), a tablet PC, a laptop computer, a desktop computer, a smartphone, a personal digital assistant (PDA), a mobile communication terminal, and other types of terminals. The gaze estimation apparatus 110 may be a terminal configured to perform image or data communication using an AP and a communication network. The terminal may include a memory configured to store a program or a protocol to communicate with an external device via the AP and the communication network, and a microprocessor configured to execute the program, perform computations, and control an operation of the terminal. The gaze estimation apparatus 110 may include any type of terminal that may communicate using an AP and a communication network, and encompasses all communication computing apparatuses, including, for example, a laptop computer, a mobile communication terminal, a PDA, and other types of communication computing apparatuses. In addition, the gaze estimation apparatus 110 may be an apparatus configured to independently capture an image regardless of whether communication is enabled or not. For example, the gaze estimation apparatus 110 may be an apparatus including a camera.

As described above, the gaze estimation apparatus 110 estimates a gaze of a user more accurately by analyzing input data including temporally consecutive images. The gaze estimation apparatus 110 estimates a gaze of a user based on a contextual relationship between obtained sets of input data, and thus improves a level of stability of the estimating, compared to analyzing a single image. For example, even when the user gazes at a same point, noise may occur in the input data when the gaze estimation apparatus 110 shakes or illumination changes. However, the gaze estimation apparatus 110 uses the contextual relationship between the sets of input data, and thus reduces or minimizes noise that may occur due to shaking of the gaze estimation apparatus 110 or a change in illumination and obtain a more accurate estimation result.

In addition, the gaze estimation apparatus 110 detects a relative movement between a user and a camera, and uses an analysis method suitable for the detected relative movement, thereby increasing a level of stability of gaze estimation. In addition, the gaze estimation apparatus 110 may determine a gaze mode, and may apply a processing method that depends on the determined gaze mode, thereby further increasing the level of stability of gaze estimation. For example, the gaze estimation apparatus 110 may use different processing methods for different gaze modes, and thus reduce or minimize an error that may occur in a result of gaze estimation.

Figure 2:
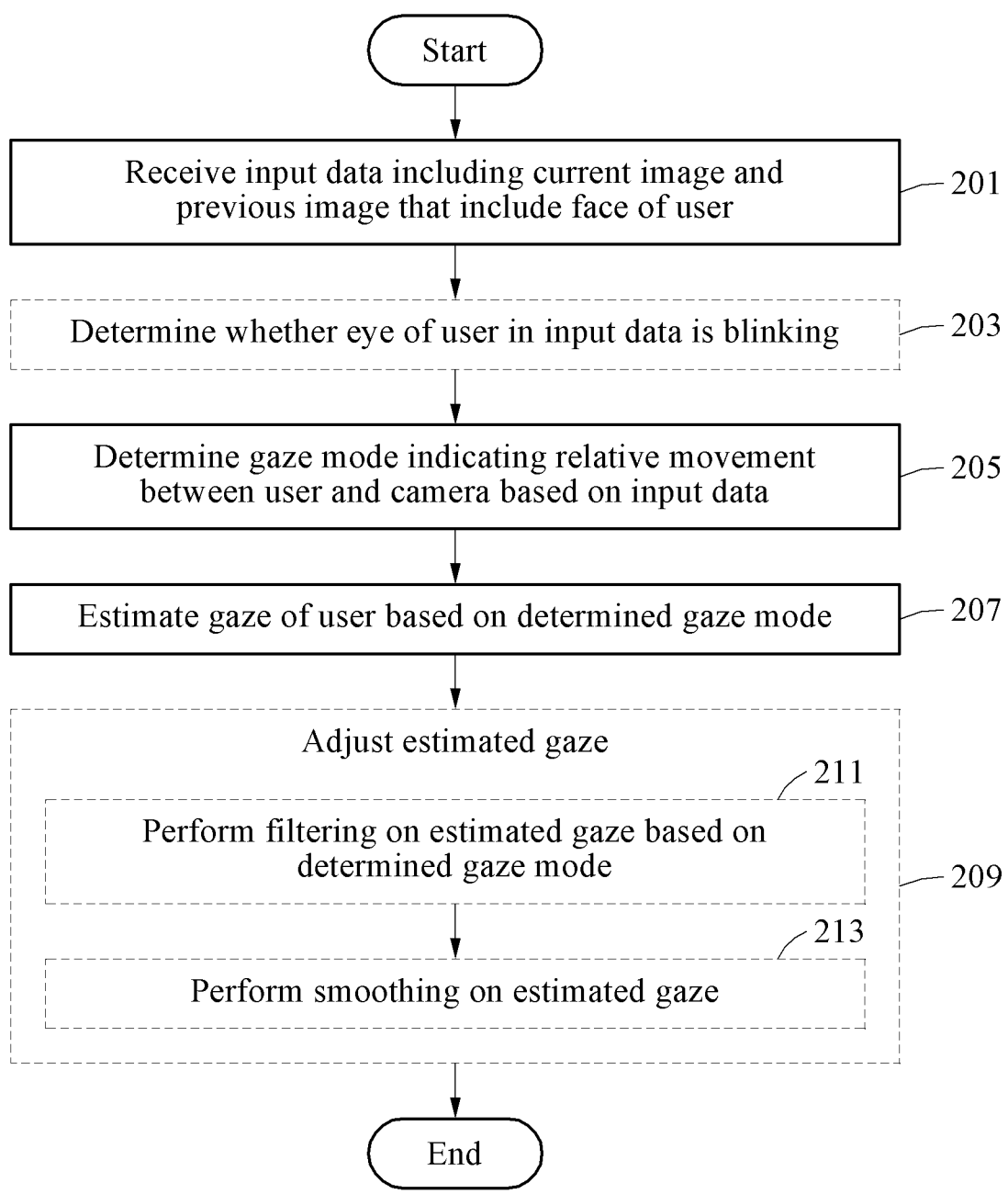
FIG. 2 is a flowchart illustrating an example of a gaze estimation method.

FIG. 2 is a flowchart illustrating an example of a gaze estimation method. The gaze estimation method is performed by a gaze estimation apparatus described herein, for example, the gaze estimation apparatus 110 of FIG. 1.

In the example of FIG. 2, in operation 201, the gaze estimation apparatus 110 receives input data including a current image and a previous image that include a face of a user. The input data may include images including a face or an eye of a user. For example, the input data may include images including the face or the eye of the user that is collected by a camera in a visible light region.

In another example, in operation 203, the gaze estimation apparatus 110 determines whether an eye of the user included in the input data is blinking. In response to a determination that the eye of the user is blinking, the gaze estimation apparatus 110 discards the input data and waits for next input data to be received. This other example will be described in greater detail later on in this description.

In operation 205, the gaze estimation apparatus 110 determines a gaze mode indicating a relative movement between the user and a camera that captured the current image and the previous image based on the input data. The determined gaze mode is one of a plurality of gaze modes including a stationary mode and a motion mode. The gaze mode indicates a relative movement between a user whose image has been captured and a camera that captured the image. The stationary mode indicates a state in which a gaze moves only finely or does not move, and the motion mode indicates a state in which a gaze moves greatly.

When the current image is an initially captured image and the previous image does not exist, the gaze estimation apparatus 110 determines the gaze mode to be the stationary mode. For example, when an initial frame among a plurality of frames included in a moving image or a video is input, there is no previous frame. In this example, the gaze estimation apparatus 110 cannot determine a relationship between the initial frame and a previous frame because there is no previous frame, and so it determines the gaze mode to be the stationary mode.

The gaze estimation apparatus 110 detects the face included in the input data. The gaze estimation apparatus 110 detects a facial feature point in the detected face. For example, the gaze estimation apparatus 110 detects a facial feature from a human face, for example, a nose, an eye, or another facial feature.

The gaze estimation apparatus 110 determines the gaze mode based on a similarity in terms of the detected facial feature point between the current image and the previous image. The gaze estimation apparatus 110 arranges the current image and the previous image, and then determines the similarity between the current image and the previous image based on a result of the arranging.

The gaze estimation apparatus 110 arranges the current image and the previous image based on a reference facial feature point of each of the current image and the previous image. To determine how similar the current image and the previous image are to each other, the gaze estimation apparatus 110 arranges or aligns the current image and the previous image side by side. For example, the gaze estimation apparatus 110 arranges the current image and the previous image side by side based on one facial feature point, for example, a location of a nose feature point. A type of a feature point and the number of feature points to be used in performing the arranging are not limited to the example described in the foregoing. In another example, the gaze estimation apparatus 110 arranges the current image and the previous image based on an eyebrow feature point. Hereinafter, a feature point that is used in performing the arranging will be referred to as a reference feature point. In addition, the gaze estimation apparatus 110 may arrange the current image and the previous image based on a reference feature point using a block matching method, for example. The block matching method is merely an example of a matching method for performing the arranging, and the matching method is not limited to the block matching method described above as an example.

The gaze estimation apparatus 110 determines the gaze mode based on a similarity in terms of a plurality of facial feature points between the current image and the previous image. That is, the gaze estimation apparatus 110 determines the similarity between the current image and the previous image using a plurality of feature points. For example, the gaze estimation apparatus 110 calculates a first similarity between a first facial feature point in the current image and a first facial feature point in the previous image. The gaze estimation apparatus 110 calculates a second similarity between a second facial feature point in the current image and a second facial feature point in the previous image. The gaze estimation apparatus 110 calculates a third similarity between a background feature point in the current image and a background feature point in the previous image. The gaze estimation apparatus 110 determines the gaze mode based on the first similarity, the second similarity, and the third similarity.

When the first similarity is greater than or equal to a first threshold value and the second similarity is greater than or equal to a second threshold value, the gaze estimation apparatus 110 determines the gaze mode to be the stationary mode. When the first similarity is less than the first threshold value and the third similarity is greater than or equal to a third threshold value, the gaze estimation apparatus 110 determines the gaze mode to the motion mode. When the first similarity is greater than or equal to the first threshold value and the second similarity is less than the second threshold value, the gaze estimation apparatus 110 determines the gaze mode to be the motion mode. When the first similarity is less than the first threshold value and the third similarity is less than the third threshold value, the gaze estimation apparatus 110 determines the gaze mode to be a gaze mode of the previous image. The first threshold value, the second threshold value, and the third threshold value may be the same as each other or different from each other.

For example, the first facial feature point may be a nose feature point and the second facial feature point may be an eye feature point. In this example, when the current image and the previous image are similar to each other in terms of a nose and the current image and the previous image are similar to each other in terms of an eye, the gaze estimation apparatus 110 determines the gaze mode to be the stationary mode. However, when the current image and the previous image are not similar to each other in terms of the nose, but are similar to each other in relation to a background, the gaze estimation apparatus 110 determines the gaze mode to be the motion mode. When the current image and the previous image are not similar to each other in terms of the eye, but are similar to each other in terms of the nose, the gaze estimation apparatus 110 determines the gaze mode to be the motion mode. When the current image and the previous image are not similar to each other in terms of the nose and are not similar to each other in terms of the background, the gaze estimation apparatus 110 does not determine the gaze mode of the current image. In such a case, the gaze estimation apparatus 110 determines the gaze mode of the current image to be the same as a gaze mode of the previous image.

In operation 207, the gaze estimation apparatus 110 estimates a gaze of the user based on the determined gaze mode. The gaze estimation apparatus 110 enhances a stability of gaze estimation by using a processing method that depends on the determined gaze mode. The gaze estimation apparatus 110 enhances the stability of gaze estimation by classifying the gaze mode into one of a plurality of different gaze modes, and using different processing methods for the different gaze modes. Thus, by using the different processing methods for the different gaze modes, the gaze estimation apparatus 110 reduces or minimizes an error that may occur in the estimating of the gaze.

In another example, in operation 209, the gaze estimation apparatus 110 adjusts the estimated gaze. In operation 211, the gaze estimation apparatus 110 performs filtering on the estimated gaze based on the determined gaze mode. The gaze estimation apparatus 110 performs the filtering using a filtering method or a parameter that depends on the determined gaze mode. The gaze estimation apparatus 110 performs the filtering by a linear filter using an existing parameter of the linear filter in response to the determined gaze mode being the stationary mode. The gaze estimation apparatus 110 performs the filtering by the linear filter after initializing the parameter of the linear filter in response to the determined gaze mode being the motion mode.

In operation 213, the gaze estimation apparatus 110 performs smoothing on the estimated gaze. The smoothing is a process of averaging a current gaze location obtained based on current input data including a current image and a previous image, and a previous gaze location obtained based on previous input data including what was then a current image and a previous image. For example, the gaze estimation apparatus 110 may calculate a weighted sum of the current gaze location and the previous gaze location to obtain a smoothed gaze location, and may update the previous gaze location each time new input data including a new current image and a new previous location is received.

Figure 4:
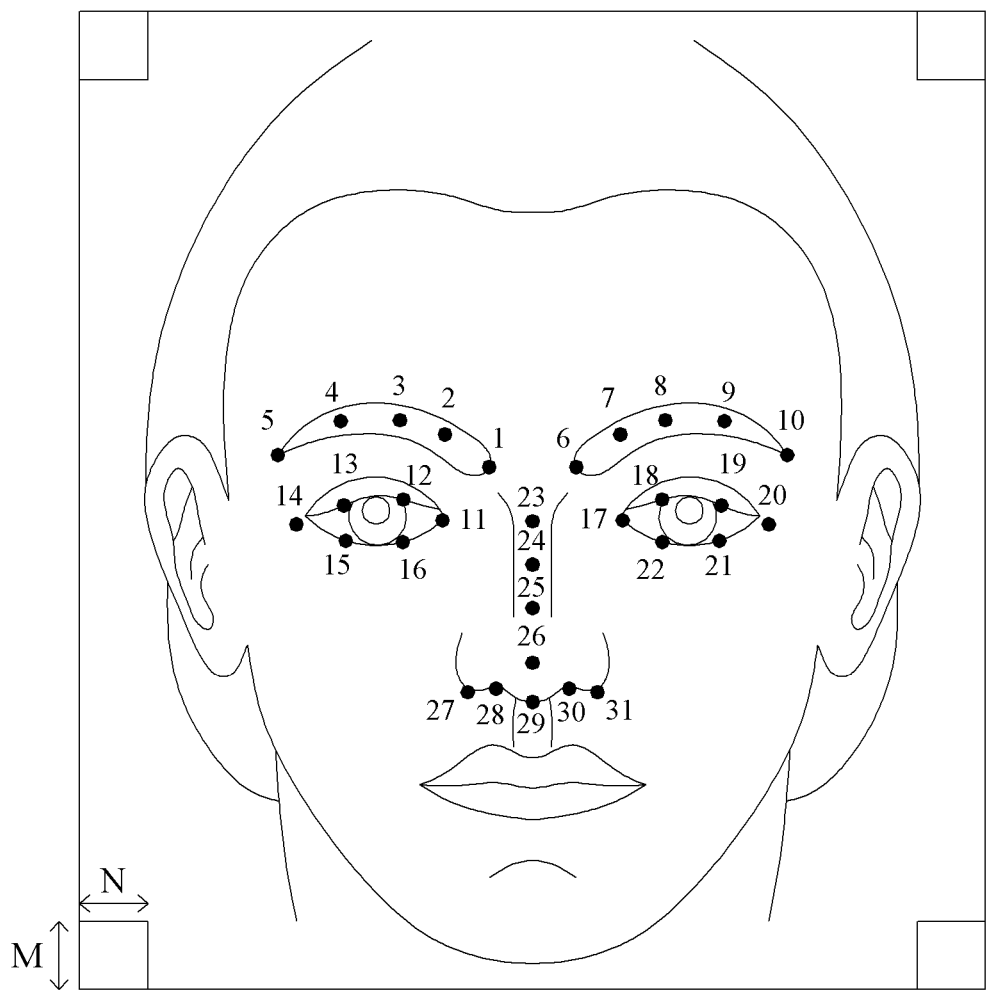
FIG. 4 is a diagram illustrating an example of facial feature points of a face of a user in an image detected by a gaze estimation apparatus.
Figure 5:
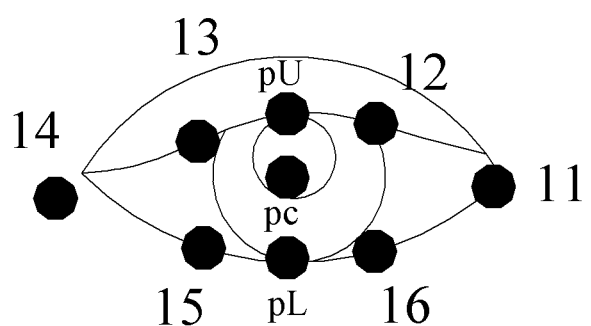
FIG. 5 is a diagram illustrating an example of eye feature points of a face of a user in an image detected by a gaze estimation apparatus.

As described above, in operation 203, the gaze estimation apparatus 110 determines whether the eye of the user included in the input data is blinking. For example, the gaze estimation apparatus 110 collects in advance an image including a face of a user, and detects a face and a feature point from a registered image including a portion of the face of the user. The gaze estimation apparatus 110 registers a facial feature of the face of the user. For example, a distribution of feature points obtained as described above may be as indicated in FIGS. 4 and 5, and the feature points may include feature points of an eyebrow, a nose, both eyes, and a forehead, for example. FIGS. 4 and 5 will be explained later in this description.

Figure 3:
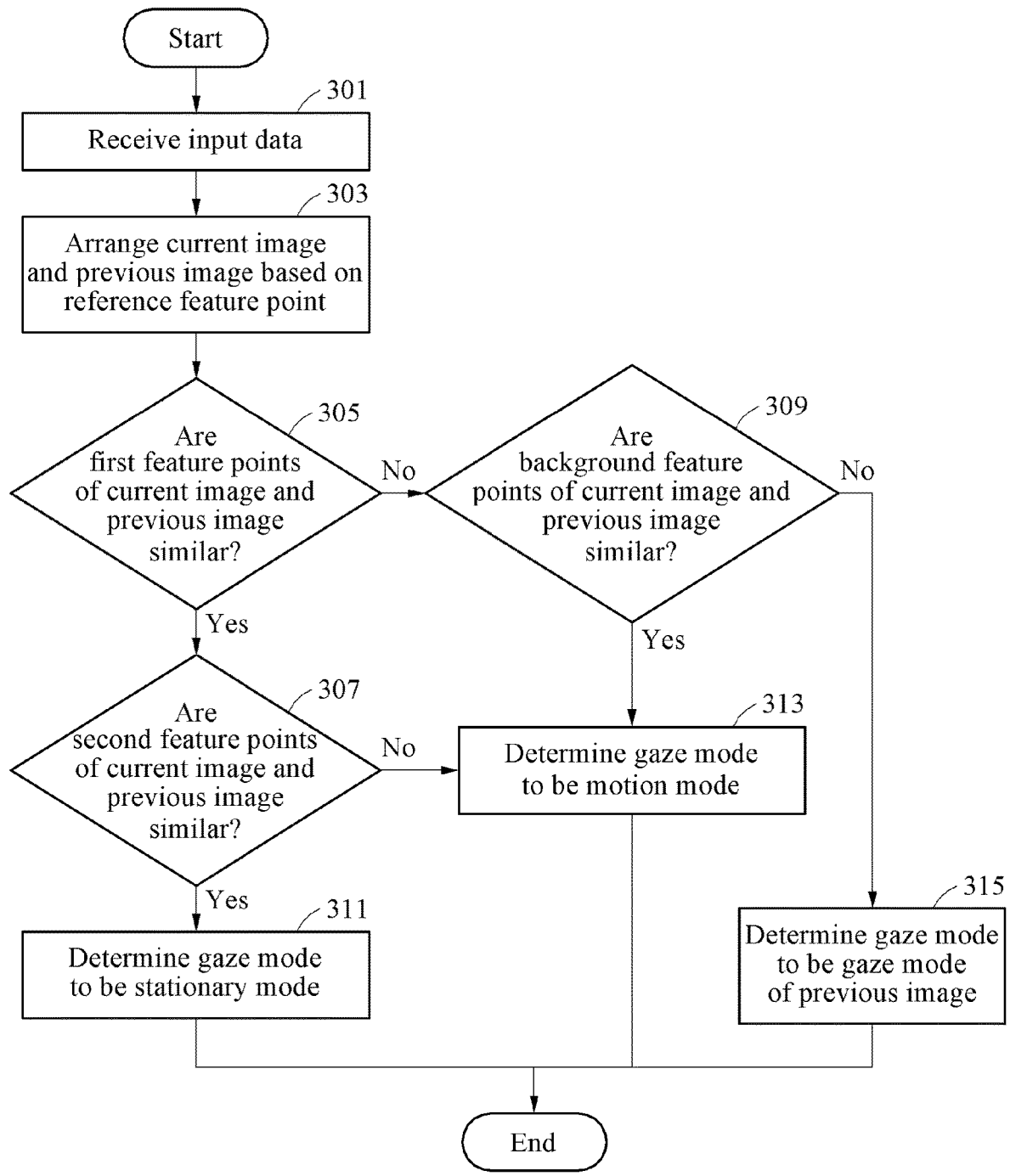
FIG. 3 is a flowchart illustrating an example of a gaze mode determination method in a gaze estimation method.

FIG. 3 is a flowchart illustrating an example of a gaze mode determination method in a gaze estimation method.

Referring to FIG. 3, in operation 301, the gaze estimation apparatus 110 receives input data. The input data may be obtained by capturing an image through a camera provided in the gaze estimation apparatus 110 and may be internally received. Alternatively, the input data may be received using a communication means through an external device.

In operation 303, the gaze estimation apparatus 110 arranges a current image and a previous image based on a reference feature point. The gaze estimation apparatus 110 arranges the current image and the previous image based on the reference feature point using a block matching method, for example.

In operation 305, the gaze estimation apparatus 110 compares a first feature point in the current image and a first feature point in the previous image and determines whether the first feature points are similar. For example, the first feature point may be an eye feature point.

In operation 307, the gaze estimation apparatus 110 compares a second feature point in the current image and a second feature point in the previous image and determines whether the second features points are similar. For example, the second feature point may be a nose feature point.

In operation 309, the gaze estimation apparatus 110 compares a third feature point in the current image and a third feature point in the previous image and determines whether the third feature points are similar. For example, the third feature point may be a background feature point.

In operation 311, when the current image and the previous image are similar to each other in terms of an eye and a nose, the gaze estimation apparatus 110 determines a gaze mode to be a stationary mode.

In operation 313, when the current image and the previous image are not similar to each other in terms of the eye, but are similar to each other in terms of a background, the gaze estimation apparatus 110 determines the gaze mode to be a motion mode. In addition, when the current image and the previous image are not similar to each other in terms of the nose, but are similar to each other in terms of the eye, the gaze estimation apparatus 110 determines the gaze mode to be the motion mode.

In operation 315, when the current image and the previous image are not similar to each other in terms of the eye and the background, the gaze estimation apparatus 110 determines the gaze mode of the current image to be a gaze mode of the previous image.

FIG. 4 is a diagram illustrating an example of facial feature points of a face of a user in an image detected by a gaze estimation apparatus. FIG. 5 is a diagram illustrating an example of eye feature points of a user in an image detected by a gaze estimation apparatus.

Referring to FIG. 4, each eyebrow includes five feature points. A left eyebrow as seen in the image includes feature points 1 through 5, and a right eyebrow as seen in the image includes feature points 6 through 10. Each eye includes six feature points. A left eye as seen in the image includes feature points 11 through 16, and a right eye as seen in the image includes feature points 17 through 22. A nose includes four feature points 23 through 26 on a ridge of the nose, and five feature points 27 through 31 on rounded edges of the nose. In addition to the facial feature points illustrated in FIG. 4, the facial feature points detected by the gaze estimation apparatus may further include feature points of lips and feature points of a forehead.

Referring to FIG. 5, each eye includes six eye feature points. For example, as illustrated, feature points 11 through 16 of the left eye as seen in the image are distributed on a face of a user. A feature point pU, a feature point pL, and a feature point pc of the left eye are calculated based on feature points 11 through 16 of the left eye. The feature point pU is an uppermost eye feature point located on an uppermost side of the left eye, the feature point pL is a lowermost eye feature point located on a lowermost side of the left eye, and the feature point pc is a central eye feature point located at a center of the left eye. Although not illustrated in FIG. 5, a feature point pU, a feature point pL, and a feature point pc of the right eye as seen in the image are calculated based on feature points 17 through 22 of the right eye.

The gaze estimation apparatus 110 determines whether an eye of a user in the input data is blinking. The gaze estimation apparatus 110 calculates an eye height represented by EYE_HEIGHT for a registered image. Based on eye feature points, the gaze estimation apparatus 110 uses, as EYE_HEIGHT, a distance between an upper eyelid and a lower eyelid. In the example of FIG. 5, EYE_HEIGHT corresponds to a distance between pU, which is a central feature point between two feature points—feature points 12 and 13—of the upper eyelid, and pL, which is a central feature point between two feature points—feature points 15 and 16—of the lower eyelid. That is, EYE_HEIGHT corresponds to the distance between the feature point pU and the feature point pL. The gaze estimation apparatus 110 may use, as EYE_HEIGHT, an eye height of either the left eye or the right eye, or an average eye height obtained by averaging an eye height of the left eye and an eye height of the right eye.

The gaze estimation apparatus 110 calculates a distance between both eyes, which is represented by EYE_DIS. The feature point pc may be a central location of the six feature points 11 through 16 of the eye, or an average value of feature points 11 through 16 of the left eye.

The gaze estimation apparatus 110 calculates a normalized eye height, which is represented by EYE_HEIGHT_NORM. The normalized eye height is a value obtained by dividing the eye height EYE_HEIGHT by the distance EYE_DIS between both eyes according to the equation EYE_HEIGHT_NORM=(EYE_HEIGHT)/(EYE_DIS).

The gaze estimation apparatus 110 receives a current image, and calculates an eye height of the current image. The eye height of the current image is represented by EYE_HEIGHT_T in which T indicates a time index of the current image. In addition, the gaze estimation apparatus 110 calculates a normalized eye height of the current image, which is represented by EYE_HEIGHT_T_NORM. The normalized eye height of the current image is a value obtained by dividing the eye height of the current image EYE_HEIGHT_T_NORM by the distance EYE_DIS between both eyes according to the equation EYE_HEIGHT_T_NORM=(EYE_HEIGHT_T)/(EYE_DIS).

The gaze estimation apparatus 110 calculates an eye blink parameter, which is represented by Blinking_T. The gaze estimation apparatus 110 calculates the eye blink parameter by dividing the normalized eye height of the current image EYE_HEIGHT_T_NORM by the normalized eye height EYE_HEIGHT_NORM according to the equation Blinking_T=(EYE_HEIGHT_T_NORM)/(EYE_HEIGHT_NORM). A value of Blinking_T that is less than an eye blink threshold corresponds to blinking, and a value of Blinking_T that is greater than or equal to the eye blink threshold corresponds to non-blinking. For example, the eye blink threshold may be 0.4, a value of Blinking_T greater than or equal to the eye blink threshold of 0.4 indicates that an eye is open, and a value of Blinking_T less than the eye blink threshold of 0.4 indicates that an eye is closed, and indicates that the eye is blinking. However, the eye blink threshold of 0.4 is merely an example, and the eye blink threshold is not limited thereto.

The gaze estimation apparatus 110 determines whether an eye is blinking through the pseudo-code listed below.

```
if (EYE_HEIGHT_T_NORM)/(EYE_HEIGHT_NORM) < th1
    return blinking
else
    return non-blinking
endif
```

For example, when the current image includes an eye blink, the gaze estimation apparatus 110 discards the current image and waits for the next input data.

As described above, the gaze estimation apparatus 110 determines whether there is an eye blink in a current image, and determines whether a human being is blinking his/her eye in an input video. When there is an eye blink, the gaze estimation apparatus 110 outputs a coordinate of an estimated gaze of a previous image. However, when a first frame, or an initial input image, includes an eye blink, there is no estimated location in a previous image, and thus the gaze estimation apparatus 110 suspends gaze estimation and waits for the next input data. When the initial input image does not include an eye blink, the gaze estimation apparatus 110 continues the gaze estimation.

The gaze estimation apparatus 110 arranges a current image and a previous image based on a reference facial feature point of each of the current image and the previous image. For example, the gaze estimation apparatus 110 sets a nose feature point as a reference feature point, and arranges the current image and the previous image based on the set nose feature point.

For example, the gaze estimation apparatus 110 obtains a reference feature point P1_nose of a previous image Img1. In this example, the gaze estimation apparatus 110 selects one of four nose feature points 23 through 26 on a ridge of a nose. For example, the gaze estimation apparatus 110 selects feature point 26 on a lowermost part of the ridge of the nose as illustrated in FIG. 4. The gaze estimation apparatus 110 sets an initial nose feature point P2_nose_init in a current image Img2. P2_nose_init and P1_nose are feature points at similar locations. Although both P2_nose_init and P1_nose are located on the nose, corresponding feature points obtained from two frames, for example, P2_nose_init and P1_nose, may not be feature points that completely correspond to each other.

The gaze estimation apparatus 110 finds a final nose feature point P2_nose_correct in the current image Img2 that completely corresponds to P1_nose. Based on P1_nose in the previous image Img1 as the reference feature point, the gaze estimation apparatus 110 obtains a reference sub-image Patch1 having a size of (2N+1)*(2M+1) pixels. The gaze estimation apparatus 110 sets a coordinate of P1_nose in the previous image Img1 to be (xc, yc). Patch1 includes all pixels having coordinates of {xc+d*i, yc+d*j}, and forms a sub-image having a size of (2N+1)*(2M+1) pixels. −N<=i<=N, and −M<=j<=M, and M and N denote integers greater than or equal to 2. For example, M=N=16. In addition, d denotes a first sample extraction interval, which is an integer greater than or equal to 1, and i and j are discussed below.

In the current image Img2, a pixel set SetA is defined. Pixels in the pixel set SetA include a pixel located at P2_nose_init and pixels around P2_nose_init. When a coordinate of P2_nose_init in the current image Img2 is (x2c, y2c), SetA includes all pixels having coordinates {(x2c+L*i, y2c+L*j)}, in which a range of values of i and j are associated with an accuracy of a feature point detection algorithm. The more accurate the algorithm, the smaller the number of pixels in SetA.

For example, when an average error of the feature point detection algorithm is e, the range of values of i and j may include all integers between −3 e/L and 3 e/L and the number of all pixels in SetA may be approximately 6 e/L*6 e/L. In this example, L denotes a second sample extraction interval, which is an integer greater than or equal to 1.

The gaze estimation apparatus 110 uses, as a reference feature point, a location of a corresponding pixel in Img2 for each pixel P2_candidate in SetA, and obtains a candidate sub-image Patch2_candidate having a size of (2N+1)*(2M+1) pixels. A detailed method of obtaining the candidate sub-image Patch2_candidate may be the same as a method of obtaining the reference sub-image Patch1 as described above. When a coordinate of P2_candidate is (x3c, y3c), Patch2_candidate includes all pixels having coordinates of {x3c+d*i, y3c+d*j}, and forms a sub-image having a size of (2N+1)*(2M+1) pixels. −N<=i<=N and −M<=j<=M.

The gaze estimation apparatus 110 then calculates a similarity Score_cand between Patch1 and each Patch2_candidate. The gaze estimation apparatus 110 may calculate the similarity using any of various methods based on, for example, a sum-of-absolute-differences (SAD), a normalized SAD, a cross-correlation (CC), a normalized CC, and others. Alternatively, the gaze estimation apparatus 110 may calculate the similarity Score_cand by applying a weight to at least one of the various methods. The gaze estimation apparatus 110 may select the normalized SAD calculated as described above.

The gaze estimation apparatus 110 selects an optimal Patch2_candidate based on the calculated similarity Score_cand, and outputs a central location of the optimal Patch2_candidate as the final nose feature point P2_nose_correct in Img2. Score_cand being optimal indicates that the optimal Patch2_candidate is the most similar one to Patch1, which is a reference image. In addition, Score_cand being small indicates that SAD and normalized SAD may be more similar. When Score_cand increases, CC and normalized CC may become more similar.

The final nose feature point P2_nose_correct is a feature point in the current image Img2 that accurately corresponds to P1_nose in the previous image Img1. The feature point may be referred to as a reference feature point, based on which the previous image Img1 and the current image Img2 may be arranged or aligned side by side.

In another example, the gaze estimation apparatus 110 reduces the second sample extraction interval L. For example, the gaze estimation apparatus 110 reduces it from 1 or 2 pixels to 0.25 or 0.5 pixels to obtain a P2_nose_correct that is accurate to a subpixel value. By reducing the second sample extraction interval L, the accuracy of P2_nose_correct is improved. In this example, a range of values of the second sample extraction interval L may be 0<L<1.

Although an example of a method of arranging or aligning a current image and a previous image has been described above based on a nose as an example, the method is not limited to the nose, and the current image and the previous image may be arranged or aligned using other features.

For example, the gaze estimation apparatus 110 may detect a facial feature point in a detected face. The gaze estimation apparatus 110 may detect a human facial feature point of a nose and an eye, for example. For example, a first feature may be a nose feature, a second feature may be an eye feature, and a third feature may be a background feature. However, the first feature, the second feature, and the third feature are not limited to the examples described in the foregoing, and other features in an image, for example, a lip feature and a forehead feature, may be used to determine a similarity between a current image and a previous image.

For example, the gaze estimation apparatus 110 may determine similarities of a nose, an eye, and a background, using three independent classifiers, and prepare a sub-image including corresponding feature points in a previous image Img1 and a current image Img2.

For the nose, when a nose feature point in the previous image Img1 is P1_nose, the gaze estimation apparatus 110 obtains P2_nose_correct, which is a feature point in the current image Img2 corresponding to P1_nose in the previous image Img1. The previous image Img1 and the current image Img2 include samples extracted based on P1_nose and P2_nose_correct, respectively.

For the eye, a sample extraction center in the previous image Img1 may be a feature point pc located at a center of the eye that is automatically obtained by a feature point detection algorithm. When a location of pc is P1_eye, the gaze estimation apparatus 110 may enlarge a rectangle extracted as a sample and including six feature points 11 through 16 at a rate of 10%, for example. A coordinate of a corresponding eye feature point in the current image Img2 may be expressed by P2_eye_correct=P1_eye+ (P2_nose_correct−P1_nose). P2_eye_correct is a corresponding eye feature point in the current image Img2 after the previous image Img1 and the current image Img2 have been arranged. The gaze estimation apparatus 110 extracts a sample for each of a left eye and a right eye, and calculates a similarity. A total similarity in terms of eyes may be set to be a similarity in terms of one eye that is less similar between both eyes. For a SAD, the total eye similarity may be a maximum value among a left eye similarity Score_cand_lefteye and a right eye similarity Score_cand_righteye.

For the background, the gaze estimation apparatus 110 may perform sample extraction from locations at four corners of each of an arranged current image Img2 and an arranged previous image Img1 that are obtained after the arranging, and obtain four pairs of corresponding sub-images. The gaze estimation apparatus 110 may determine, to be a total background similarity, a similarity of the least similar pair of sub-images.

To determine a similarity in terms of nose, eye, and background, a method of extracting a sample may be the same as a method of obtaining Patch1 and Patch2_candidate having a size of (2N+1)*(2M+1) pixels as described above. However, N and M may be different than the examples of N and M described above.

The gaze estimation apparatus 110 may determine such nose, eye, and background similarities using the three independent classifiers. For example, the gaze estimation apparatus 110 may extract an image feature from a previous image and a current image, and perform classification using a scale-invariant feature transform (SIFT) and a support vector machine (SVM). In another example, the gaze estimation apparatus 110 may use an optimal value of a similarity Score_cand in block matching. In this example, when the similarity Score_cand is greater than a preset threshold, for example, when the similarity Score_cand is 2, the gaze estimation apparatus 110 may determine that the current image and the previous image are similar to each other.

The gaze estimation apparatus 110 may adjust an estimated gaze. The gaze estimation apparatus 110 may perform filtering on the estimated gaze based on the determined gaze mode. For example, the gaze estimation apparatus 110 may perform the filtering on the estimated gaze using a linear filter. In this example, when the gaze mode is a stationary mode, the gaze estimation apparatus 110 may perform the filtering using the linear filter based on a current parameter. When the gaze mode is a motion mode, the gaze estimation apparatus 110 may perform the filtering using the linear filter after initializing the current parameter of the linear filter. An input to the linear filter may include an estimated result, for example, a location of the estimated gaze.

For example, the linear filter may include a zero-velocity Kalman filter. When the gaze mode is the motion mode, the gaze estimation apparatus 110 may initialize, to be 1, a covariance of a prediction result of a previous time of the zero-velocity Kalman filter.

In another example, the linear filter may further include a constant-velocity Kalman filter, in addition to the zero-velocity Kalman filter. In this example, the gaze estimation apparatus 110 may use the two filters simultaneously to perform the filtering. When the gaze mode is the stationary mode, the gaze estimation apparatus 110 may perform the filtering using a parameter of the zero-velocity Kalman filter. When the gaze mode is the motion mode, the gaze estimation apparatus 110 may perform the filtering using the constant-velocity Kalman filter by initializing the parameter of the zero-velocity Kalman filter. The gaze estimation apparatus 110 may set a parameter of a Kalman filter according to Equations 1 through 5 below.

$$X(k|k-1)=A*X(k-1|k-1)+B*U(k) \quad (1)$$

$$P(k|k-1)=A*P(k-1|k-1)*A'+Q \quad (2)$$

$$Kg(k)=P(k|k-1)*H'/(H*P(k|k-1)*H'+R) \quad (3)$$

$$X(k|k)=X(k|k-1)+Kg(k)*(Z(k)-H*X(k|k-1)) \quad (4)$$

$$P(k|k)=(I-Kg(k)*H)*P(k|k-1) \quad (5)$$

In the above equations A and B denote system parameters. A' denotes a transposed matrix of A, and Q denotes a covariance of a process noise system. R denotes a covariance for observing noise, and Z(k) denotes a measurement value of k time. H denotes a parameter of a measurement system. In a case of a multi-measurement system, H is a matrix. H' denotes a transposed matrix of H. P denotes a covariance, which is represented by Equation 2. In Equation 2, P(k|k−1) denotes a covariance corresponding to X(k|k−1), and P(k−1|k−1) denotes a covariance corresponding to X(k−1|k−1). U(k) denotes a control amount for a system at a k time. I denotes a matrix of 1, and I=1 for a single measurement of a single model.

Referring to Equation 5 above, as X(k|k), P(k|k), and Kg(K) continue to be updated based on a time, A, B, U, R, and Q are not updated to be a set or fixed parameter.

X(k|k−1) and P(k|k−1) are intermediate calculated values, in which k denotes a current time and k−1 denotes a previous time. X(k|k) denotes a result at the current time obtained after filtering, which may be based on an output according to an example of the present disclosure. Estimation of Q and R may need to be performed on a dataset. In an example, a gaze location may be represented in a form of a coordinate (x, y). In this example, the zero-velocity Kalman filter may perform filtering on each of x and y, and the constant-velocity Kalman filter may perform the filtering on each of x and a velocity in an x-direction, and y and a velocity in a y-direction.

For the zero-velocity Kalman filter, a target on which the filtering is to be performed includes only a gaze location. I, A, and H are a constant 1. B is 0, which indicates Bu(k) is 0. In addition, R and Q denote parameters to be adjusted. X(k−1|k−1) denotes a gaze location after the filtering when the corresponding system is at k−1. X(k|k−1) is an intermediate value of a gaze location that is calculated based on a gaze location at a k−1 time of the system after the filtering. P(k−1|k−1) denotes a covariance at the k−1 time, and P(k|k−1) is an intermediate covariance value that is calculated based on a covariance at the k−1 time. Kg(k) denotes a Kalman gain at the k time. X(k|k) denotes a gaze location at the k time after the system filtering, or an output of the zero-velocity Kalman filter. Z(k) denotes a gaze location output by the gaze estimation apparatus 110 at the k time. P(k|k) denotes a covariance at the k time.

For example, when the current time k is a first time, for an output of a gaze location by the gaze estimation apparatus 110, k−1 is the k time, and P(k−1|k−1)=1 and X(k−1|k−1)=Z(k). For the initialization of the zero-velocity Kalman filter, when the current time k is the first time, the gaze estimation apparatus 110 reinitializes P(k−1|k−1) and X(k−1|k−1).

For the constant-velocity Kalman filter, an amount or a quantity to be filtered includes a gaze location and a gaze velocity. I denotes a unit matrix, and A is $$\begin{bmatrix} 1 & \mathrm{delta}(k) \\ 0 & 1 \end{bmatrix}.$$

H denotes a unit matrix. B is 0, which indicates Bu(k) is 0. In addition, R and Q denote parameters to be adjusted and are each a 2*2 matrix. X(*) denotes a two-dimensional (2D) vector and includes, for example, two rows and one column. The first dimension is a gaze location after the filtering, and the second dimension is a gaze velocity after the filtering. P(*) denotes a 2D matrix and is a covariance matrix. In detail, X(k−1|k−1) denotes a gaze location and a gaze velocity after the filtering at a k−1 time of the corresponding system, and X(k|k−1) denotes an intermediate value of a gaze location and a gaze velocity that is calculated based on a gaze location and a gaze velocity after the filtering at the k−1 time of the system. In addition, P(k−1|k−1) denotes a covariance at the k−1 time, and P(k|k−1) denotes an intermediate value of a covariance that is calculated based on the covariance at the k−1 time. Kg(k) denotes a Kalman gain at a k time. X(k|k) denotes a gaze location and a gaze velocity after the filtering at the k time of the system. A one-dimensional (1D) gaze location is an output of the constant-velocity Kalman filter. Z(k) denotes a gaze location output by the gaze estimation apparatus 110 at the k time, and a gaze velocity estimated based on the gaze location output by the gaze estimation apparatus 110. P(k|k) denotes a covariance at the k time.

For the constant-velocity Kalman filter, V denotes a gaze velocity. The gaze velocity may not be directly observable, but may be calculated based on an observable gaze location. For example, the gaze velocity V is a value obtained by calculating a difference in position by subtracting a gaze location at a previous time from a gaze location at the current time, and dividing the difference in position by a time interval between the previous time and the current time. The gaze velocity V may be calculated according to Equation 6 below.

$$V=(\text{pos}(k)-\text{pos}(k-1))/\text{delta}(k) \qquad (6)$$

In Equation 6, pos(k) denotes a gaze location estimated by the gaze estimation apparatus 110 at a current time k, and pos(k−1) denotes a gaze location estimated by the gaze estimation apparatus 110 at a previous time k−1. In addition, delta(k) denotes a time interval and is associated with collecting frequencies of sets of data of two frames by a camera. For example, when the camera obtains an image of 25 frames per second, an interval between the two frames is 40 milliseconds (ms), and thus delta(k)=40 ms.

For the zero-velocity Kalman filter, when the current time k is set to be an initial time, or when an output of the gaze estimation apparatus 110 is initially received, k−1 is a k time, P(k−1|k−1) is a unit matrix, and X(k−1|k−1)=Z(k), in which a 2D velocity V of Z(k) is 0.

The constant-velocity Kalman filter has stronger constraints than the zero-velocity Kalman filter, and thus the gaze estimation apparatus 110 obtains a more accurate estimation result using the constant-velocity Kalman filter, compared to using only the zero-velocity Kalman filter.

The gaze estimation apparatus 110 determines a similarity between a previous image and a current image as described above, and determines a gaze mode to be one of a plurality of different gaze modes based on the determined similarity. Thus, the gaze estimation apparatus 110 uses a relationship between collected sets of input data, and obtains a more accurate estimation result using such a relationship. The gaze estimation apparatus 110 may apply different processing methods to the different gaze modes to prevent an error.

In addition, the gaze estimation apparatus 110 performs smoothing on an estimated gaze. For example, a gaze location represented as "location" is obtained N times, in which N denotes a natural number greater than 1. In this example, location_smooth=(1−smooth_param)*location+smooth_param*location_history, and location_history=location_smooth. A smoothed value of the gaze location, which is represented by location_smooth, is equal to a weighted sum of a current gaze location (location) and a previous gaze location (location_history). The previous gaze location may be updated each time a new frame is input.

When an initial gaze location (location) is obtained, location_history=location, and location_smooth=(1−smooth_param)*location+smooth_param*location_history. smooth_param denotes a smoothing parameter and may be equal to 0.5. However, this is just an example, and smooth_param is not limited to 0.5. In addition, location_history is a variable that needs to be stored and indicates a history of a location. When a current image is a first frame, location_history is a gaze location that is obtained for the first frame, and the gaze estimation apparatus 110 initializes the gaze location of the current image and continue to update the gaze location afterward.

Figure 6:
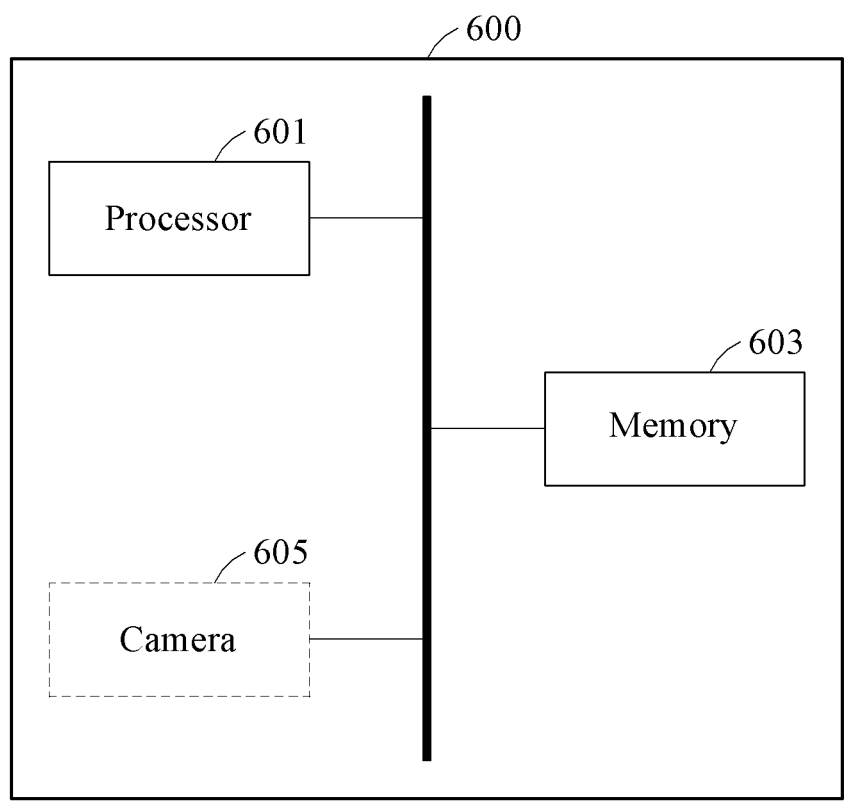
FIG. 6 is a diagram illustrating an example of a gaze estimation apparatus.

FIG. 6 is a diagram illustrating an example of a gaze estimation apparatus.

Referring to FIG. 6, a gaze estimation apparatus 600 estimates a gaze of a user by analyzing input data including at least two images that are temporally close to each other and include a face of the user. The gaze estimation apparatus 600 more quickly and stably estimates the gaze of the user by classifying a relative movement between the user and a camera obtaining the input data and varying a processing method based on a result of the classifying. The gaze estimation apparatus 600 increases an accuracy of an estimation result by detecting an eye blink of the user and excluding the detected eye blink from a list of targets to be analyzed.

Referring to FIG. 6, the gaze estimation apparatus 600 includes at least one processor 601 and a memory 603. The gaze estimation apparatus 600 further includes a camera 605.

The memory 603 stores input data including a current image and a previous image that include a face of a user. The memory 603 stores commands or instructions for various functions to be performed by the processor 601. The memory 603 stores a structure and parameters of a neural network to be used for gaze estimation.

The processor 601 determines whether an eye of the user in the input data is blinking. In response to a determination that the eye of the user is blinking, the processor 601 discards the input data and waits for the next input data to be received. This is because gaze estimation based on input data including an eye blink may be basically ineffective or invalid, and thus may result in noise in an output of a subsequent operation. Thus, by removing the input data including the eye blink, the gaze estimation apparatus 600 enhances an overall performance of the gaze estimation.

The processor 601 determines a gaze mode indicating a relative movement between the user and the camera 605 based on the input data. The determined gaze mode is one of a plurality of gaze modes including a stationary mode and a motion mode.

The processor 601 detects the face included in the input data. The processor 601 detects a facial feature point in the detected face. For example, the processor 601 detects a facial feature such as, for example, an eye feature, a nose feature, or other facial feature.

The processor 601 determines the gaze mode based on a similarity in terms of the detected facial feature point between the current image and the previous image. The processor 601 arranges the current image and the previous image based on a reference facial feature point in each of the current image and the previous image. The processor 601 determines the gaze mode based on a similarity in terms of a plurality of facial feature points between the current image and the previous image based on a result of the arranging. For example, the processor 601 determines the similarity between the current image and the previous image based on an eye feature point, a nose feature point, and a background feature point, and determines the gaze mode based on the determined similarity.

The processor 601 estimates a gaze of the user based on the gaze mode. The processor 601 reduces or minimizes an error that may occur in the estimating by using different processing methods for different gaze modes.

The processor 601 may adjust the estimated gaze. The processor 601 may perform filtering on the estimated gaze based on the gaze mode. The processor 601 may also perform smoothing on the estimated gaze.

The description of the gaze estimation apparatus 110 illustrated in FIG. 1 and the description of the gaze estimation method illustrated in FIGS. 2 through 5 are also applicable to the gaze estimation apparatus 600 illustrated in FIG. 6.

The gaze estimation 110 illustrated in FIG. 1 and the gaze estimation apparatus 600 illustrated in FIG. 6 are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 through 5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software includes machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), programmable read-only memory (PROM), electrically erasable programmable read-only memory (EEPROM), random-access memory (RAM), dynamic random-access memory (DRAM), static random-access memory (SRAM), flash memory, non-volatile memory, memory cards, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disk drives (HDD), solid-state disk drives (SSD), and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A gaze estimation method comprising:
receiving, by a processor, input data comprising a current image and a previous image each comprising a face of a user;
determining, by the processor, a gaze mode indicating a relative movement between the user and a camera that captured the current image and the previous image based on the input data;
estimating, by the processor, a gaze of the user based on the determined gaze mode; and
adjusting, by the processor, the estimated gaze,
wherein the determined gaze mode is one of a plurality of gaze modes comprising a stationary mode and a motion mode,
the determining of the gaze mode and the estimating of the gaze are performed, by the processor, based on images captured by a single camera, and
the adjusting comprises:
performing filtering by a linear filter using a parameter of the linear filter in response to the determined gaze mode being the stationary mode; and
performing the filtering by the linear filter by initializing the parameter of the linear filter in response to the determined gaze mode being the motion mode.

2. The gaze estimation method of claim 1, wherein the adjusting comprises performing smoothing on the estimated gaze.

3. The gaze estimation method of claim 1, wherein the determining of the gaze mode comprises determining the gaze mode to be the stationary mode in response to the current image being an initially captured image and the previous image not existing.

4. The gaze estimation method of claim 1, wherein the determining of the gaze mode comprises:
detecting the face included in the input data; and
detecting a facial feature point in the detected face.

5. The gaze estimation method of claim 4, wherein the determining of the gaze mode further comprises determining the gaze mode based on a similarity in terms of the detected facial feature point between the current image and the previous image.

6. The gaze estimation method of claim 5, wherein the determining of the gaze mode further comprises:
arranging the current image and the previous image based on a reference facial feature point of each of the current image and the previous image; and
determining the gaze mode based on a similarity in terms of a plurality of facial feature points between the current image and the previous image based on a result of the arranging.

7. The gaze estimation method of claim 2, wherein the determining of the gaze mode further comprises:
calculating a first similarity in terms of a first facial feature point between the current image and the previous image;
calculating a second similarity in terms of a second facial feature point between the current image and the previous image;
calculating a third similarity in terms of a background feature point between the current image and the previous image; and
determining the gaze mode based on the first similarity, the second similarity, and the third similarity.

8. The gaze estimation method of claim 7, wherein the determining of the gaze mode further comprises:
determining the gaze mode to be the stationary mode in response to the first similarity being greater than or equal to a first threshold value and the second similarity being greater than or equal to a second threshold value;
determining the gaze mode to be the motion mode in response to the first similarity being less than the first threshold value and the third similarity being greater than or equal to a third threshold value;
determining the gaze mode to be the motion mode in response to the first similarity being greater than or equal to the first threshold value and the second similarity being less than the second threshold value; and
determining the gaze mode to be a gaze mode of the previous image in response to the first similarity being less than the first threshold value and the third similarity being less than the third threshold value, wherein the first threshold value, the second threshold value, and the third threshold value are equal to each other, or are different from each other.

9. The gaze estimation method of claim 1, further comprising:
determining whether an eye of the user included in the input data is blinking; and
discarding the input data and waiting for next input data to be received in response to a result of the determining being that the eye of the user is blinking.

10. A non-transitory computer-readable storage medium storing instructions that, when executed by a processor, cause the processor to perform the gaze estimation method of claim 1.

11. A gaze estimation apparatus comprising:
at least one processor; and
a memory, wherein the memory is configured to store input data comprising a current image and a previous image each comprising a face of a user, and
the at least one processor is configured to:
determine a gaze mode indicating a relative movement between the user and a camera that captured the current image and the previous image based on the input data;
estimate a gaze of the user based on the determined gaze mode;
adjust, by the processor, the estimated gaze,
wherein the determined gaze mode is one of a plurality of gaze modes comprising a stationary mode and a motion mode,
the at least one processor is further configured to determine the gaze mode and estimate the gaze based on images captured by a single camera, and
for the adjusting, at least one processor is configured to:
perform filtering by a linear falter using a parameter of the linear filter in response to the determined gaze mode being the stationary mode; and perform the filtering by the linear filter by initializing the parameter of the linear filter in response to the determined gaze mode being the motion mode.

12. The gaze estimation apparatus of claim 11, wherein the at least one processor is further configured to perform smoothing on the estimated gaze.

13. The gaze estimation apparatus of claim 11, wherein the at least one processor is further configured to:
   detect the face included in the input data; and
   detect a facial feature point in the detected face.

14. The gaze estimation apparatus of claim 13, wherein the at least one processor is further configured to determine the gaze mode based on a similarity in terms of the detected facial feature point between the current image and the previous image.

* * * * *